June 19, 1956   C. D. BAILEY   2,750,728
SEALING ASSEMBLY FOR THE HEADER MOUNT OF A SIDEHILL HARVESTER
Filed June 20, 1951   3 Sheets-Sheet 1

INVENTOR
Clifford D. Bailey
BY *Webster & Webster*
ATTORNEYS

June 19, 1956  C. D. BAILEY  2,750,728
SEALING ASSEMBLY FOR THE HEADER MOUNT OF A SIDEHILL HARVESTER
Filed June 20, 1951  3 Sheets-Sheet 3

INVENTOR
Clifford D. Bailey
BY Webster & Webster
ATTORNEYS

# United States Patent Office 2,750,728
Patented June 19, 1956

2,750,728

SEALING ASSEMBLY FOR THE HEADER MOUNT OF A SIDEHILL HARVESTER

Clifford D. Bailey, Stockton, Calif., assignor to Harris Manufacturing Company, Stockton, Calif., a corporation of California Application June 20, 1951, Serial No. 232,646

12 Claims. (Cl. 56—209)

This invention relates in general to improvements in a header mount for a sidehill harvester; the header including a header spout which projects ahead of the harvester body from rear end communication with the thresher cylinder housing, the spout being adjustable both up and down and about a longitudinal axis, whereby the header may be maintained at proper working height and parallel to the ground on a sidehill, and yet continue unobstructed delivery of the cut crop into said threshing cylinder housing. A header mount of this type is shown in copending application, Serial No. 220,303 filed on April 10, 1951, entitled Harvester, now Patent No. 2,656,668, issued October 27, 1953.

The header mount includes cooperating, relatively movable parts, and the major object of this invention is to provide a novel sealing assembly between such cooperating parts; such sealing assembly being operative to prevent escape of the cut crop as it transfers from the header spout into the threshing cylinder housing, and also to prevent escape of threshed grain out of said housing between said cooperating parts.

An additional object of the invention is to provide a sealing assembly, for a header mount as above, which is effective in any working position of the header spout; the sealing assembly being simple in structure but capable of long service without requiring replacement or repair.

A further object of the invention is to provide a sealing assembly especially adapted for a header mount which includes relatively rotatable cooperating parts; such parts, in the present embodiment, including an upstanding, forwardly facing mounting disc supporting and through which the header spout feeds, and a disc mounting ring fixed on the forward end of the body about the intake opening of the threshing cylinder housing.

It is also an object of this invention to provide a sealing assembly, for a header mount, which is designed for ease and economy of manufacture and installation.

Still another object of the invention is to provide a practical and reliable sealing asembly for a header mount, and one which will be exceedingly effective for the purpose for which it is designed.

These objects are accomplished by means of such structure and relative arrangement of parts as will fully appear by a perusal of the following specification and claims.

Figure 1:
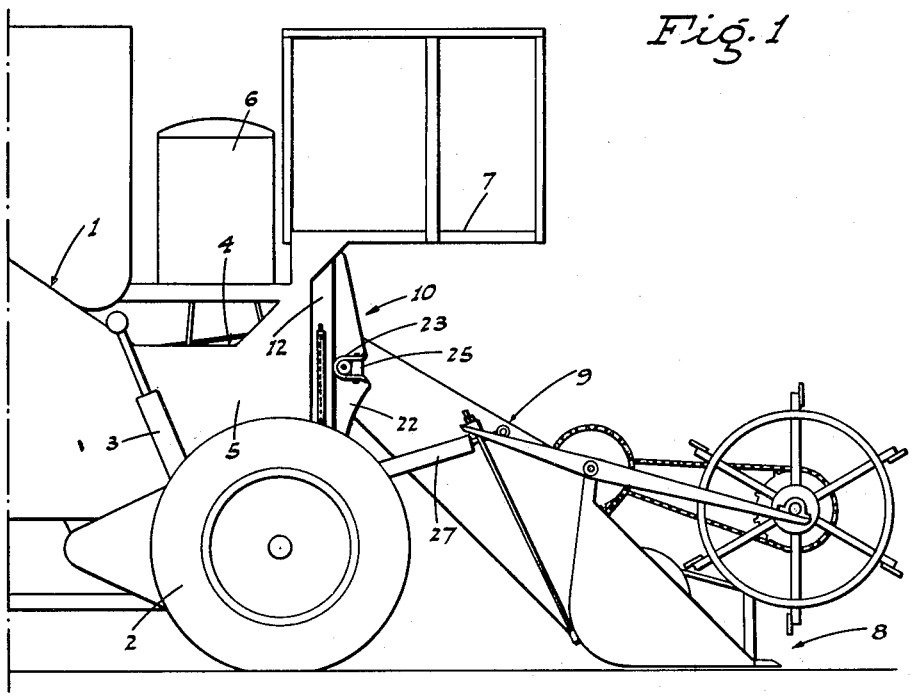
Fig. 1 is a somewhat diagrammatic fragmentary side elevation showing the forward portion of a sidehill harvester embodying the present invention.
Figure 2:
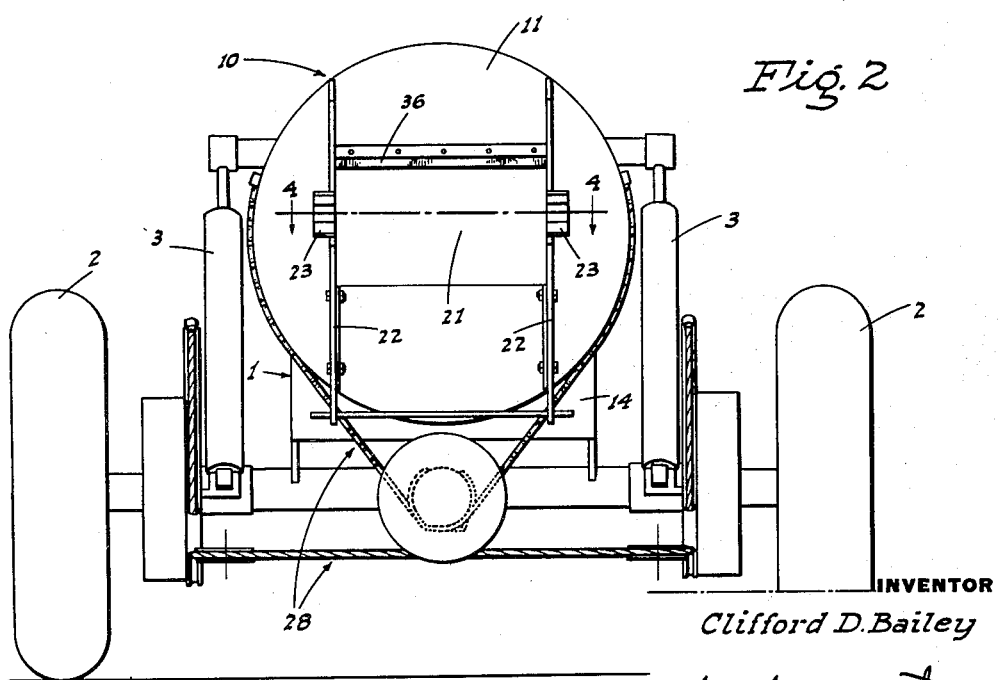
Fig. 2 is a fragmentary front elevation of the harvester showing the header mount which embodies the present invention, but with the header spout and header detached.
Figure 3:
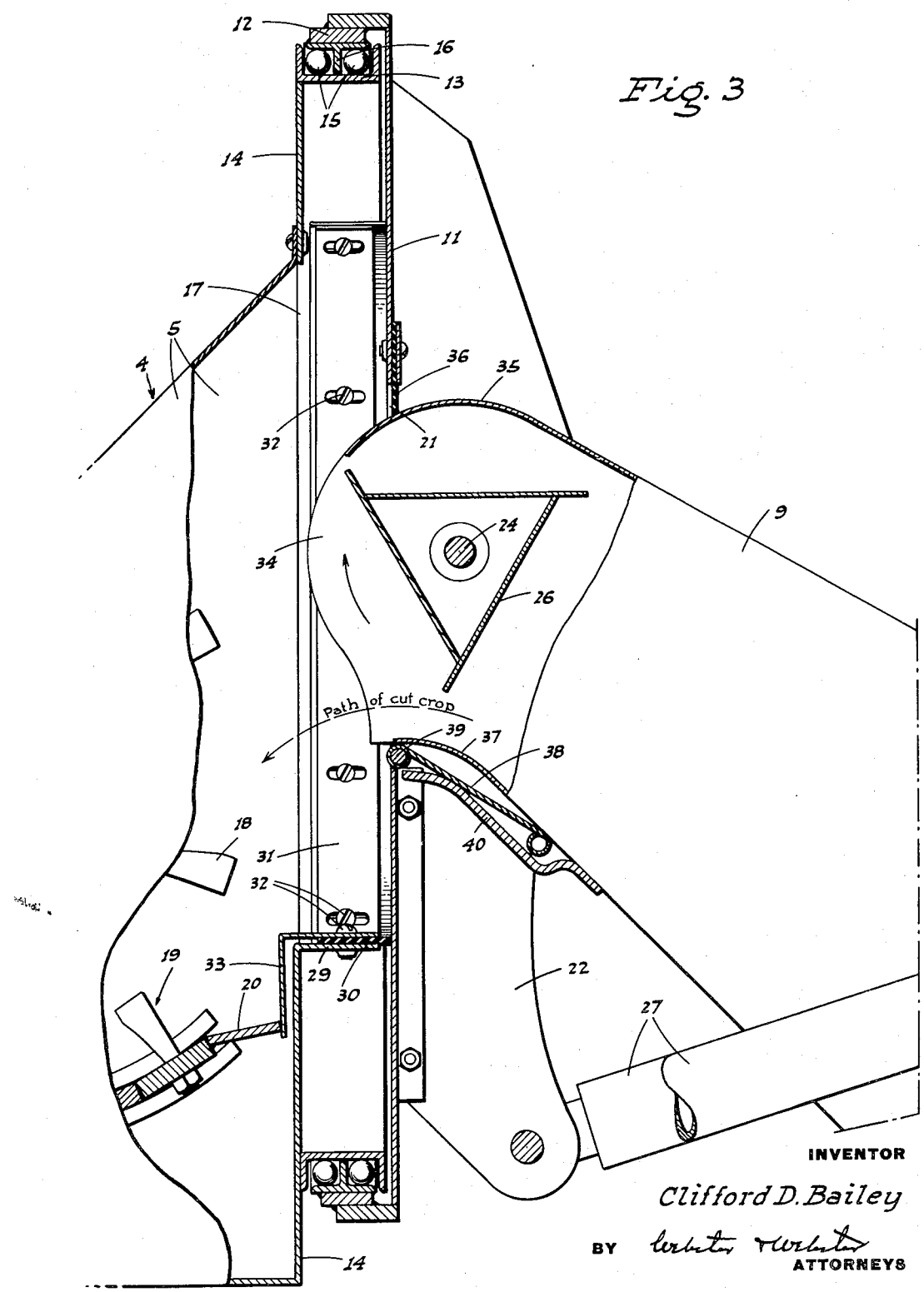
Fig. 3 is an enlarged fragmentary central longitudinal section showing the header mount and associated sealing assembly.
Figure 4:
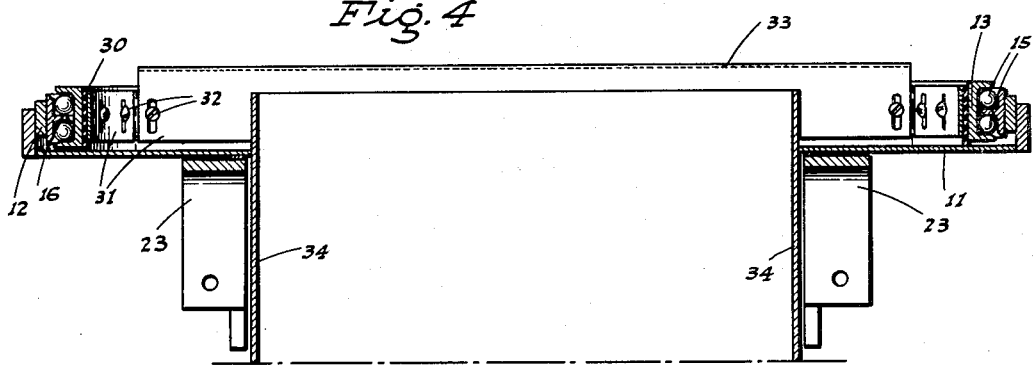
Fig. 4 is an enlarged fragmentary sectional plan view taken on line 4—4 of Fig. 2.
Figure 5:
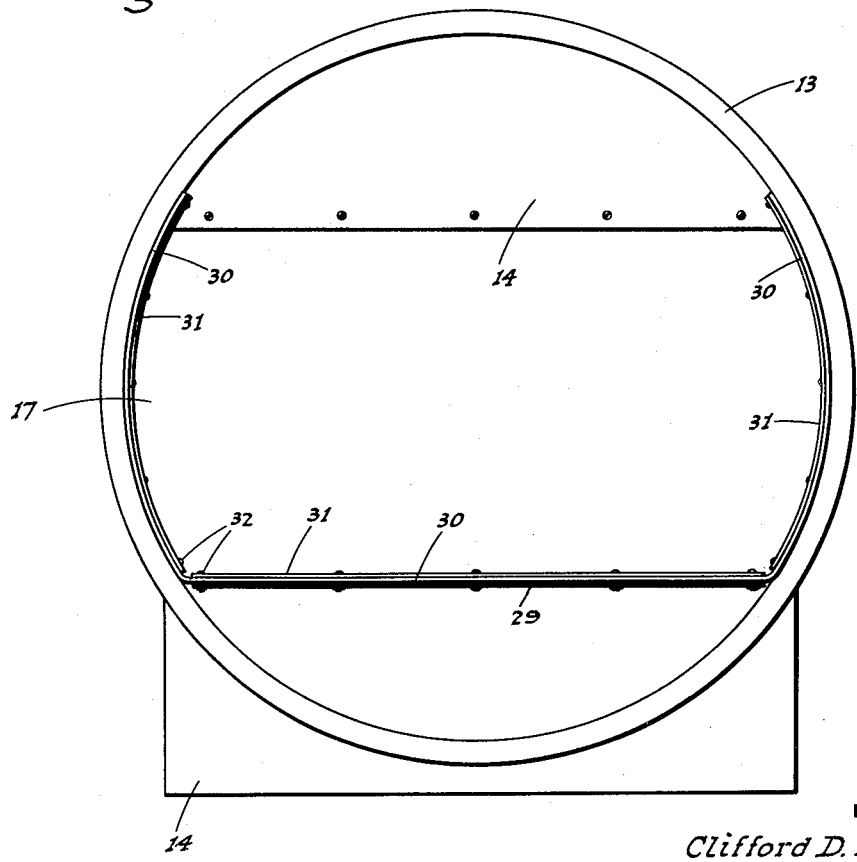
Fig. 5 is an enlarged fragmentary front elevation showing the mounting ring, with certain of the sealing elements thereon; the mounting disc being detached.

Referring now more particularly to the characters of reference on the drawings, the numeral 1 indicates generally the longitudinally extending body of a self-propelled sidehill type harvester; such body being supported, at the front end, by transversely spaced rubber-tire wheels 2 mounted for up and down adjustment; such wheels being simultaneously adjusted, in opposition, i. e. one up and the other down, by power cylinders 3. The purpose of such adjustment of the wheels 3 in opposition is of course to maintain the body 1 perpendicular when the harvester is working on a sidehill.

At the front end thereof the body 1 includes a threshing cylinder housing 4 having sides 5; there being an engine enclosing case 6 above the housing 4, and the operator's platform 7 projects ahead of the case 5, as shown.

Some distance forwardly of the front wheels 2 the harvester includes a header, indicated generally at 8, having an upwardly and rearwardly inclined, centrally disposed header spout 9; such header spout 9 being connected to the forward end of the body 1 by a header mount, indicated generally at 10.

The header mount comprises an upstandting, forwardly facing, heavy-duty mounting disc 11 fitted, at its periphery, with a rearwardly projecting retention flange 12 which surrounds a heavy-duty mounting ring 13 affixed to the front plate 14 of the harvester body 1 in coaxial relation to said disc 11.

The mounting ring 13 is of outwardly opening channel configuration, and ball bearings 15 are disposed in such channel, being maintained therein by a T-like retainer 16 fixed to the annular retention flange 12. With this arrangement the mounting disc 11 is rotatably carried on the mounting ring 13.

The front plate 14 of the body 1 is formed with a rectangular opening 17 within the confines of the mounting ring 13, and which opening communicates in symmetrical relation with the forward end of the threshing cylinder housing 4 which is included in the body. Within the threshing cylinder housing 4 the harvester includes, as usual, a transverse axis, threshing cylinder, shown in part at 18, and which cylinder cooperates at the bottom with a concave 19; such concave, at its front lower edge, including a fixed, forwardly projecting lip 20 which extends full distance between the sides 5 of the threshing cylinder housing 4. At its forward edge the lip 20 terminates adjacent but short of the front plate 14 for the purpose hereinafter described.

The mounting disc 11 likewise has a substantially centrally disposed rectangular opening 21 therein, and the upper end of the header spout 9 projects through such opening 21 for the purpose of feeding the cut crop from said spout into the threshing cylinder housing 4.

The upper end portion of the header spout 9 is attached to the mounting disc 11 in the following manner:

A pair of transversely spaced, upstanding attachment plates 22 are fixed to the front of the mounting disc 11 and project forwardly therefrom; such attachment plates being formed, intermediate their ends, with transversely alined, forwardly opening cradles 23.

A cross shaft 24 extends through the upper portion of the header spout 9, and is journaled in the cradles 23, being normally retained therein by retention blocks 25. The cross shaft 24 is driven, and within the upper portion of the header spout 9 is fitted with a rotary beater or feeder 26. The cut crop from the header 8 is conveyed upwardly in the header spout 9 by suitable conveying means (not shown), and at the upper portion of such spout is fed by the rotary beater 26 out of the spout into the threshing cylinder housing 4, as indicated.

With the header spout 9 attached to the mounting disc 11, as above described, such header spout is capable of being adjusted up or down whereby to maintain the header 8 at proper working height; such adjustment being accomplished by a power cylinder 27 connected between the lower portion of each attachment plate 22 and a forward elevated point on the header spout 9.

In order to maintain the header 8 parallel to the ground at all times, and particularly when the harvester is working on a hillside, the mounting disc 11 is rotated about the mounting ring 13 to obtain the desired result; the mounting disc 11 being automatically rotated to the necessary extent one way or the other, and in response to adjustment of the front wheels 2 in opposition, by means of a mounting disc control mechanism, indicated generally at 28. This control mechanism is shown and described in detail in the above identified copending application.

In order to provide adequate seals between the relatively movable parts of the header mount, the latter includes the following:

At the bottom of the opening 17 in the front plate 14 the latter is formed, at the bottom of said opening, with a horizontal, transversely extending, forwardly projecting flange 29 which extends chordally in the mounting ring 13 from side to side thereof a distance below the axis of the latter.

A continuous sealing strip 31 lies atop flange 29 from end to end thereof and thence turns and extends up the inner sides of the mounting ring 13 to a termination a substantial distance above the inner end portion of the header spout 9; such strip being flat, and of heavy-duty resilient material, such as rubber. The sealing strip 30 is relatively wide, and has sufficient forward projection to engage with the mounting disc 11; such sealing strip being held in place by a matching retention band 31, which band is attached by screws 32.

With the foregoing arrangement an effective seal is obtained between the mounting disc 11 and the mounting ring 13 for the full length of the flange 29 and up the inner sides of the mounting ring 13 to a relatively high point; such seal assuring against escape of the cut crop, or threshed grain, out of the threshing cylinder housing 4 in a forward direction and between the mounting ring 13 and disc 11.

The retention band 31 is extended rearwardly in the portion thereof corresponding to the flange 29, and includes, at its rear edge, a depending spring flange 33 which extends full distance between the sides 5 of the threshing cylinder housing 4, and bears under tension against the front edge of the lip 20. This provides a seal or closure ahead of the concave 19 to prevent the cut crop or threshed grain from dropping through the space between the concave 19 and front plate 14.

The seal between the upper end portion of the header spout 9 and the mounting disc 11 is constructed as follows:

The sides 34 of the spout are parallel and lie in close relation to the corresponding side edges of the opening 21 in the mounting disc 11, so that no additional seal is required.

The upper end portion of the header spout 9 is crowned at the top, as at 35, with such crown on an arc concentric to the cross shaft 24; there being a full-width flexible sealing apron 36 secured horizontally to the mounting disc 11 above the opening 21 and depending into wiping relation with the crown 35. Consequently, in any position of vertical adjustment of the header spout 9, the apron 36 maintains an effective seal with said crown 35.

The upper end portion of the header spout 9 has a bottom 37 which is curved in generally corresponding relation to the crown 35; there being a full-width closure plate 38 hinged at its upper edge, as at 39, to the mounting disc 11 at the bottom edge of the opening 21. The closure plate 38 extends at a forward and downward incline, being urged at all times into contact with the bottom of the upper end portion of the header spout by a leaf spring 40. Consequently, in any position of vertical adjustment of the header spout 9 the closure plate 38 maintains its engagement with the latter, providing an effective seal or closure against escape of the cut crop or threshed grain from the threshing cylinder housing 4.

With the above described sealing assembly, for the header mount, the mounting disc 11 can turn to any position of rotative adjustment, or the header spout 9 can occupy any position of vertical adjustment, with an effective closure or seal being maintained at the front end of the threshing cylinder housing 4 between all of the relatively movable parts of said header mount.

From the foregoing description it will be readily seen that there has been produced such a device as substantially fulfills the objects of the invention, as set forth therein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a harvester, a threshing-cylinder housing in which the threshing mechanism is disposed, a header spout projecting ahead of the housing to feed grain into said housing, a mounting ring fixed on the front end of the housing, said end of the housing having an opening within the ring, a mounting disc attached to the rear end portion of the spout at right angles to the ring, the mounting disc having an opening through which said spout feeds, means securing the ring and disc adjacent the periphery for relative rotation, and sealing means engaged between the ring and disc without restricting said relative rotation thereof.

2. In a harvester, a threshing-cylinder housing in which the threshing mechanism is disposed, a header spout projecting ahead of the housing to feed grain into said housing, a mounting ring fixed on the front end of the housing, said end of the housing having an opening within the ring, a mounting disc attached to the rear end portion of the spout at right angles to the ring, the mounting disc having an opening through which said spout feeds, means securing the ring and disc adjacent the periphery for relative rotation, and sealing means engaged between the ring and disc below and to the sides of the opening in the mounting disc, and without restricting said relative rotation.

3. In a harvester, a threshing-cylinder housing in which the threshing mechanism is disposed, a header spout projecting ahead of the housing to feed grain into said housing, a mounting ring fixed on the front end of the housing, said end of the housing having an opening within the ring, a mounting disc attached to the rear end portion of the spout, the mounting disc having an opening through which said spout feeds, means securing the ring and disc adjacent the periphery for relative rotation, and sealing means disposed within the confines of the mounting ring engaged between the latter and the disc without restricting said relative rotation.

4. A harvester structure, as in claim 3, in which the sealing means extends from side to side of the ring below the opening in the mounting disc, and thence up the inner sides of the ring laterally of said opening.

5. A harvester structure, as in claim 4, in which the sealing means is a sealing strip having a wiping contact along one edge with the rear face of the mounting disc.

6. In a harvester, a housing, a spout projecting ahead of the housing, a mounting ring fixed on the front end of the housing, said end of the housing having an opening within the ring, a mounting disc attached to the rear end portion of the spout, the mounting disc having an opening through which said spout feeds, means securing the ring and disc adjacent the periphery for relative rotation, a transverse flange projecting forwardly into the mounting ring from the front end of the housing at the lower edge of the opening in the latter, said flange extending from side to side of said mounting ring, a sealing strip extending on the flange for its full length and thence up the inner sides of the ring, and means securing the sealing strip to said flange and ring with the strip in wiping engagement with the rear face of the mounting disc.

7. A harvester structure, as in claim 6, in which said strip securing means is a band engaging on the strip in matching relation, and elements securing the band to the flange and ring.

8. A harvester structure, as in claim 7, in which the housing encloses a transverse axis cylinder and a concave cooperating with the cylinder from below, and a full width lip projecting forward from the front edge of the concave to adjacent but terminating short of the front end of said housing; the portion of the band corresponding to the flange being extended rearwardly and formed with a depending full width closure flange which bears against the front edge of said lip.

9. In a harvester, a threshing-cylinder housing in which the threshing mechanism is disposed, a header spout projecting ahead of the housing to feed grain into said housing, a mounting ring fixed on the front end of the housing, said end of the housing having an opening within the ring, a mounting disc attached to the rear end portion of the spout, the mounting disc having an opening through which said spout feeds, means securing the ring and disc adjacent the periphery for relative rotation, sealing means engaged between the ring and disc without restricting said relative rotation thereof, the spout being adjustable up or down, and sealing means engaged between the mounting disc and spout without restricting adjustment of the latter.

10. In a harvester, an upstanding plate having an opening therein, a grain feeding spout extending from the plate, the spout being of substantially rectangular form in cross section, means mounting the spout in connection with the plate for up or down adjustment, the inner end portion of the spout projecting through the opening and said mounting means including a cross shaft extending through the inner end portion of the spout, said portion of the spout being curved at the top concentric to the shaft, and a full width sealing apron attached to the plate above the spout and having wiping contact with said curved top portion thereof.

11. A harvester structure, as in claim 10, including a full width closure plate hinged to said upstanding plate at the lower edge of the opening and thence projecting outwardly, and spring means urging the closure plate into relative slidable contact with the bottom of the spout.

12. In a harvester having a threshing-cylinder housing in which the threshing mechanism of the harvester is disposed and having an opening in its forward end, a vertical plate over the opening, means between the housing and plate mounting the latter at its periphery for relative rotation about a horizontal axis and said plate having an opening registering with the housing opening, a header spout ahead of the plate and projecting through the plate opening to feed grain into the housing, and means mounting the spout on the plate for relative rotation about a transverse axis; sealing means between the spout and plate at the top and bottom of the spout opening, and sealing means between the plate and housing about the opening therein.

References Cited in the file of this patent

UNITED STATES PATENTS

| | | |
|---|---|---|
| 623,341 | Steck | Apr. 18, 1899 |
| 840,603 | Bodvig | Jan. 8, 1907 |
| 1,055,417 | Robinson | Mar. 11, 1913 |
| 1,981,099 | Fender | Nov. 20, 1934 |
| 2,034,637 | Mooney | Mar. 17, 1936 |
| 2,056,977 | Nicholls | Oct. 13, 1936 |
| 2,219,226 | Gerber | Oct. 22, 1940 |
| 2,441,292 | Schroeder et al. | May 11, 1948 |
| 2,491,236 | Waterman | Dec. 13, 1949 |